(No Model.)

O. H. TITUS.
MACHINE FOR REDUCING WHEAT AND OTHER GRAIN.

No. 286,973. Patented Oct. 16, 1883.

WITNESSES
W. E. Bowen
Chas. R. Burr

INVENTOR
Odeon H. Titus
by Chas. N. Forbes
Attorney

UNITED STATES PATENT OFFICE.

ODEON H. TITUS, OF WILMINGTON, DELAWARE, ASSIGNOR OF ONE-HALF TO THE J. MORTON POOLE COMPANY, OF SAME PLACE.

MACHINE FOR REDUCING WHEAT AND OTHER GRAIN.

SPECIFICATION forming part of Letters Patent No. 286,973, dated October 16, 1883.

Application filed January 8, 1883. (No model.)

*To all whom it may concern:*

Be it known that I, ODEON H. TITUS, a citizen of the United States, residing at the city of Wilmington, in the county of New Castle and State of Delaware, have invented a new and useful Improvement in Machines for Reducing Wheat and other Grain; and I do hereby declare that the following is a full, clear, and exact description thereof, reference being had to the accompanying drawings, forming a part of the same, in which—

Figure 1:
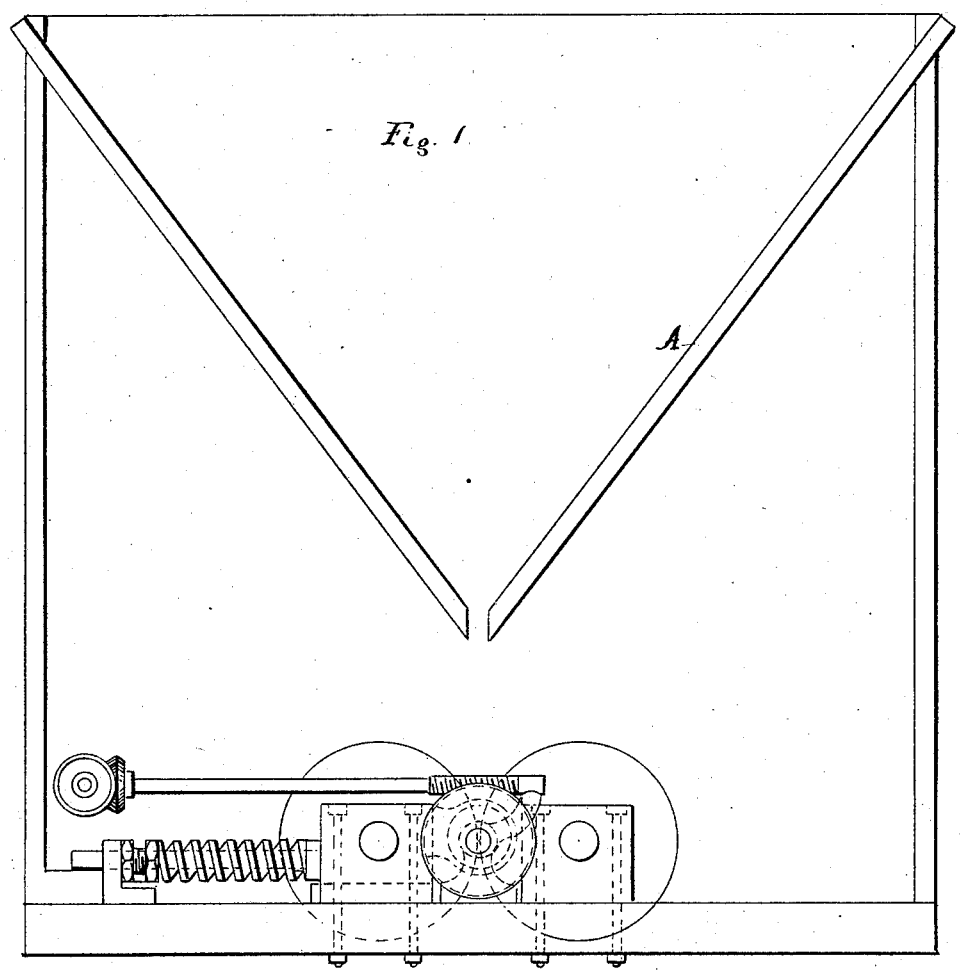
Figure 2:
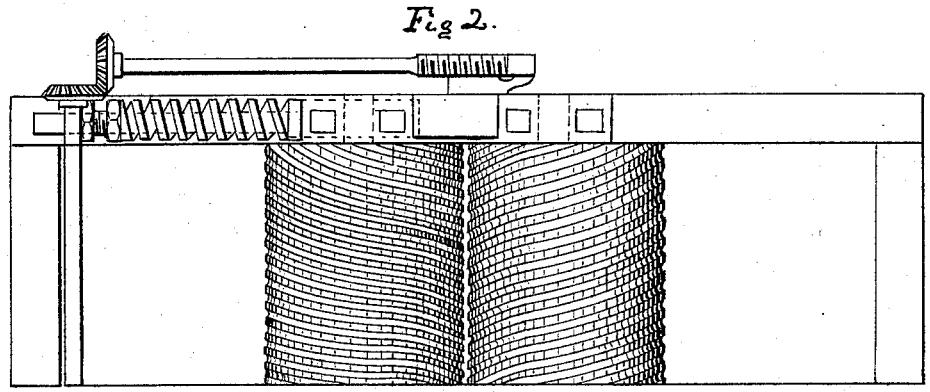

Figure 1 is a side view, showing the relative position of the hopper and reducing-rolls; and Fig. 2, a plan view of a pair of rolls and frame-work, the surface of the rolls being provided with spiral grooves, hereinafter fully explained.

The invention relates to certain mechanism used in the preliminary step practiced in the process of gradual reduction, known as the "first break;" and it consists in a first-break machine provided with spirally-grooved rollers and an elevated hopper, whereby the grain is gravitated and subjected to the action of said rollers.

In order that others may practice my invention, I will proceed to describe the devices wherewith the result aimed at may be effected, and subsequently to point out in the claim what I desire to secure by Letters Patent.

In my experiments I have found that the roller grinding or crushing mills at present employed in modern establishments are easily adapted to carry out my invention, the accompanying drawings illustrating a side and plan view of a pair of rollers, and such other parts of a machine as are necessary to show the only essential changes in adapting the machine at present in use to accomplish the purpose of my invention.

In the side view, Fig. 1, the hopper A is shown with its feeding or delivery end located a sufficient distance above the rollers in order that the grain may gravitate and present its base or heavier end to the action of the rolls in passing between them. In the plan view, Fig. 2, the surfaces of the rollers are represented with spiral grooves, which are cut with sharp pitch and of a depth corresponding with their width, and may be, respectively, left hand or right hand, or right and left hand, the first two arrangements requiring the same or a differential velocity, while the latter demands a differential speed.

The rolls being adjusted to a proper distance apart, the grain will be seized by the spiral ribs that separate the grooves and given a rolling motion as it passes endwise between the rollers, the pressure of the rollers upon the grain being sufficient to spread open or break the grain without crushing, which action opens the crease in the grain and liberates the germ and other impurities.

Having thus fully described the same, what I desire to secure by Letters Patent is—

A first-break machine provided with spirally-grooved rollers, substantially as described, and an elevated hopper, whereby the grain is gravitated and subjected to the action of said rollers, in the manner set forth.

ODEON H. TITUS.

Witnesses:
J. MORTON POOLE, Jr.,
THOMAS P. MORGAN.